United States Patent [19]
Tanaka et al.

[11] Patent Number: 5,764,612
[45] Date of Patent: Jun. 9, 1998

[54] DISC PLAYING APPARATUS WITH TWO CHASSIS AND MOVABLE DISC GUIDES

[75] Inventors: Choku Tanaka; Shinsaku Tanaka, both of Tokyo; Shigeru Akatani, Kawasaki; Akira Iwakiri, Musashino, all of Japan

[73] Assignee: Tanashin Denki Co., Ltd., Tokyo, Japan

[21] Appl. No.: 638,538

[22] Filed: Apr. 26, 1996

[30] Foreign Application Priority Data

Feb. 17, 1996 [JP] Japan ................. 8-054146

[51] Int. Cl.⁶ ................................................ G11B 17/04
[52] U.S. Cl. ................................................ 369/75.2
[58] Field of Search ......................... 369/75.2, 75.1, 369/77.1; 360/99.06

[56] References Cited

U.S. PATENT DOCUMENTS

| | | | |
|---|---|---|---|
| 4,513,409 | 4/1985 | Staar | 369/77.1 |
| 4,682,320 | 7/1987 | d'Alayer de Costemore d'Arc | 369/77.1 |
| 4,764,917 | 8/1988 | Sugihara et al. | 369/77.1 |
| 4,875,113 | 10/1989 | Arata | 360/74.2 |
| 4,979,160 | 12/1990 | Araki | 369/75.2 |
| 5,381,393 | 1/1995 | Ohtani | 369/264 |

FOREIGN PATENT DOCUMENTS

| | | | |
|---|---|---|---|
| 60-160061 | 8/1985 | Japan | 369/77.1 |
| 4-30665 | 5/1992 | Japan . | |
| 7-53138 | 12/1995 | Japan . | |
| 2135811 | 9/1984 | United Kingdom . | |

*Primary Examiner*—Stuart S. Levy
*Assistant Examiner*—Kevin M. Watkins
*Attorney, Agent, or Firm*—Dickinson Wright PLLC

[57] ABSTRACT

A disc playing apparatus is disclosed, which is simple, small in size and can be manufactured at a low cost of manufacture. In this disc playing apparatus, a first chassis with left and right movable guides and a second chassis with a disc drive and a playing unit are linked together such that they can be brought toward and away from each other. The movable guides are separated from a disc when the two chassis are brought toward each other, and are brought to a position to engage with the disc when the two chassis are brought away from each other. A selective close/away holding mechanism holds the two chassis in a close-to-each-other state or an away-from-each-other state. The two chassis are brought toward each other when the disc is inserted while pushing the selective close/away holding mechanism. The disc is pushed by the mechanism when the two chassis are brought away from each other by an eject lever.

15 Claims, 15 Drawing Sheets

DISC PLAYING APPARATUS WITH TWO CHASSIS AND MOVABLE DISC GUIDES

BACKGROUND OF THE INVENTION

This invention relates to a disc playing apparatus for playing data recorded on a disc data recording medium and also sometimes recording data on the recording medium.

In a disc playing apparatus for playing data recorded on a disc type data recording medium, such as CD, VCD, DVD and CD-ROM, generally a disc inserted into the apparatus is retracted by a disc transfer mechanism to a predetermined position and then set in an operative position through relative movement of the disc and a playing unit caused by a disc setting mechanism. Then, the transfer mechanism is brought apart from the disc, and in this state the disc is driven for rotation by a disc drive for data reproduction in the playing unit.

This type of disc playing apparatus requires the disc transfer mechanism and disc setting mechanism and also requires means for driving these mechanisms. Therefore, the apparatus has a complicated and large size construction, and it is difficult to reduce the cost of manufacture of the apparatus.

SUMMARY OF THE INVENTION

The disc playing apparatus according to the present invention comprises a first chassis with a pair of, i.e., left and right, movable guides, and a second chassis with a disc drive and a playing unit, these chassis being disposed such that they face each other and can be close to each other. When the two chassis come close to each other, namely to a close-to-each-other state, the two movable guides are spaced apart from the disc. When the two chassis come away from each other, namely to an away-from-each-other state, the movable guides are in engagement with the outer edge of the disc. A selective close/away holding mechanism selectively holds the two chassis in the close-to-each-other state. When the disc is inserted, its outer edge pushes a selective close/away holding mechanism to bring the two chassis to be close to each other. An eject lever causes the two chassis to be more away from each other. When the chassis are caused to be more away from each other, the selective close/away holding mechanism pushes the disk back outward.

In the above arrangement of this apparatus, the disc is inserted entirely manually. The disc is ejected automatically as it is pushed back by the selective close/away holding mechanism in an interlocked relation to the movement of the eject lever. The inserted disc pushes the selective close/away holding mechanism to automatically bring the first and second chassis to be closer to each other, whereby it is set in a playing position. Thus, any setting mechanism for setting the disc in the playing position is unnecessary. A means for driving such mechanism is also unnecessary. This permits simplification and size reduction of the apparatus and also permits great reduction of the cost of manufacture.

Other features and advantages of the invention are as follows. The playing unit may be adapted such that the playing operation is brought about with the disc partly exposed out of the apparatus. In this case, the disc rotation state can be recognized at a glance, and also the apparatus can be further reduced in size.

In this construction, a disc insertion/take-out slot may be formed such that it has a sufficiently large dimension in the disc thickness direction. Doing so eliminates the possibility of contact of the disc with edges of the disc insertion/take-out slot irrespective of vibration of the disc in its thickness directions during rotation.

The selective close/away holding mechanism may include a lock lever which is mounted on either one of the first and second chassis so as to be reciprocally moved, a return spring biasing the lock lever in one direction, and an engaging/disengaging portion provided on the other one of the first and second chassis. When no disc is loaded in the apparatus, the engaging/disengaging portion is in engagement with the lock lever to hold the two chassis to be more away from each other, namely to the away-from-each-other state. When movement of the lock lever against the biasing force of the return spring is caused by the disc insertion, the engagement is released. A biasing spring which biases the first and second chassis toward each other, is provided such that when the lock lever is pushed by the disc, the chassis which have been held away from each other, are brought toward each other. When the chassis are switched from the close-to-each-other state to the away-from-each-other state, the lock lever is restored by the return spring to push back the disc.

The engaging/disengaging portion may include a lever separating portion, which separates the lock lever from the disc toward the end of the operation of bringing the first and second chassis toward each other. This arrangement permits automatic separation of the disc from the lock lever while the two chassis are brought toward each other.

A part of the lock lever that is to be in contact with the disc may be constituted as a brake portion made of a soft material. In this case, the lock lever can brake the disc right after de-energization of the motor.

A stationary guide is provided before the pair of movable guides. When inserting the disc, the disc is pushed with its edge in engagement with the stationary guide. The direction of movement of the disc is thus restricted by the stationary guide. Suitably, left and right inner surfaces of the stationary guide that can face the disc edge are formed with grooves narrower than the thickness of the disc, and bent-type disc fly-out prevention springs are disposed in these grooves such that their bent portions can project into the path of movement of the disc. In this case, the inserted disc reaches the movable guides by pushing away these disc fly-out prevention springs with its edge. When the disc is ejected, the disc fly-out prevention springs prevent excessive ejection of the disc. Besides, since disc guide surfaces are above and below the disc fly-out prevention springs, it is possible to obtain smooth insertion and take-out of the disc.

With the first and second chassis coupled together by a coupling mechanism such that these chassis can be brought toward and away from each other while they are held parallel to each other, it is possible to set a small maximum distance, by which the chassis are brought away from each other, and further apparatus size reduction can be obtained. In this case, with the first chassis secured in position in the apparatus while permitting the second chassis to be brought toward and away from the first chassis, the disc can be inserted fully straight and thus comfortably.

As a different method of coupling the first and second chassis, the two chassis are pivoted at an end of each side to each other. This coupling of the chassis is very simple. In this case, again with the first chassis secured in position in the apparatus while permitting the second chassis to be brought toward and away from the first chassis, the disc can be inserted fully straight and thus comfortably.

Conversely, with the second chassis secured in position in the apparatus while permitting the first chassis to be turned relative to the second chassis, it is not needed to move the second chassis, which carries the disc drive and is comparatively heavy. Thus, the chassis can be smoothly brought toward and away from each other.

It is suitable that the pair of movable guides have brake portions of a soft material to be in contact with the disc. In this case, the disc can be braked by the movable guides right after de-energization of the disc.

Provided are a return spring which biases the eject lever in one direction, and an eject lock mechanism which can engage with the eject lever. The eject lock mechanism may be adopted such that when the eject lever is moved against the biasing force of the return spring with the first and second chassis held close to each other, it is moved to a position to prohibit the restoration of the eject lever with the operation of the chassis away from each other, and gets out of the restoration prohibiting position with the operation of the chassis toward each other. This arrangement permits satisfactory setting of the timings of the movement of the eject lever and the relative movements of the first and second chassis.

The eject lock mechanism may be constituted by part of the coupling mechanism which couples together the first and second chassis. This arrangement permits further structure simplification.

The eject lever, when it is moved against the biasing force of the return spring, turns on an on-off switch, which controls the disc drive, then brings the pair of movable guides into contact with the disc, and then brings the first and second chassis away from each other. In the disc insertion, when the eject lever is restored upon releasing of its restoration prohibition by the eject lock mechanism with the relative movement of the first and second chassis from the away-from-each-other state over to the close-to-each-other state, the eject lever separates the movable guides from the disc and then turns on the switch. This arrangement permits satisfactory setting of the timings of the disc drive on-off control, the operations of the first and second chassis toward and away from each other, and the operations of the movable guides.

The selective close/away holding mechanism or the eject lever may be provided with the lever separating portion, which can slightly separate the lock lever from the disc toward the end of the operation of the first and second chassis toward each other. In this case, the lock lever can be automatically separated from the disc in an interlocked relation to the operation of the chassis toward each other.

The disc drive includes a turntable rotatable with the disc set thereon and a motor for driving the turntable for rotation. The first chassis includes a clamp, which has an upper flange portion and serves to clamp the disc in cooperation with the turntable. The pair of movable guides have respective integral clamp holders, and the first chassis has an engaging portion. As the clamp holders are brought into contact with and separated from the clamp with the operations of the movable guides toward and away from each other, the clamp holders are engaged with and disengaged from the engaging portion, and at this time they are moved in directions substantially parallel to the central axis of the clamp. When the clamp holders are moved toward the clamp, they raise the flange portion to greatly separate the clamp from the turntable. Conversely, when the clamp holders are brought away from the clamp, they are greatly separated from the flange portion. With this arrangement, it is possible to provide satisfactory setting of the timings of the engagement and disengagement of the turntable and the clamp and also the engagement and disengagement of the movable guides with respect to the disc. In addition, it is possible to ensure a sufficient distance of movement in both directions, in which the clamp holders are brought toward and away from the clamp.

The clamp holders may have muffling portions to be in contact with the clamp. With this arrangement, the clamp holders, while in continual rotation due to their momentum, can be brought into contact with the clamp without noise generation, in addition to obtaining an anti-vibration effect and a braking effect wit h respect to the clamp.

The above features and advantages of the invention will now be more fully understood from the detailed description of the preferred embodiments when the same is read with reference to the accompanying drawings.

DETAILED DESCRIPTION OF THE PREFERRED EMBODIMENTS

A preferred embodiment of the disc playing apparatus according to the invention will now be described with reference to the drawings.

Figure 1:
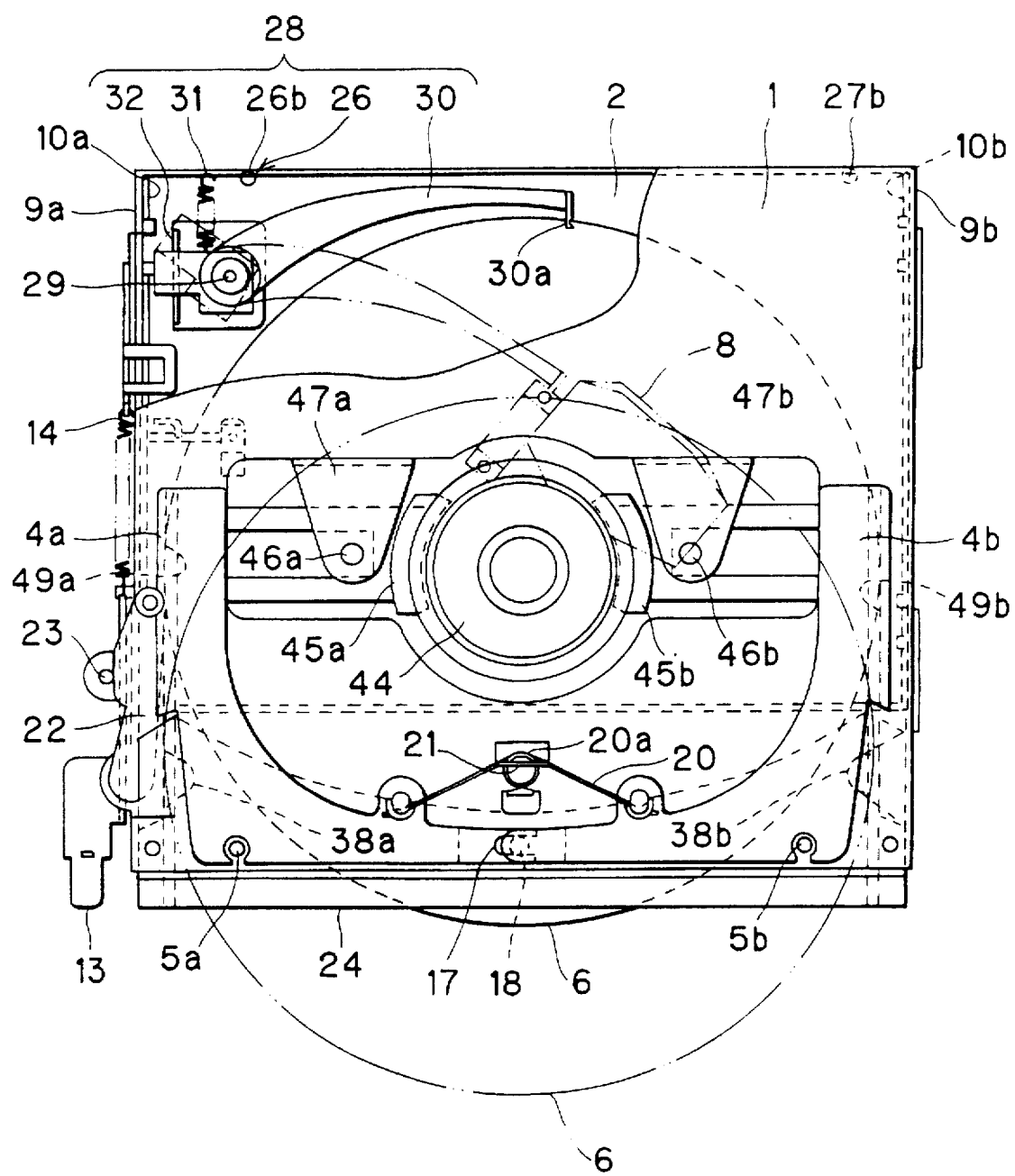
FIG. 1 is a plan view showing the mechanical part of a disc playing apparatus embodying the invention.
Figure 2:
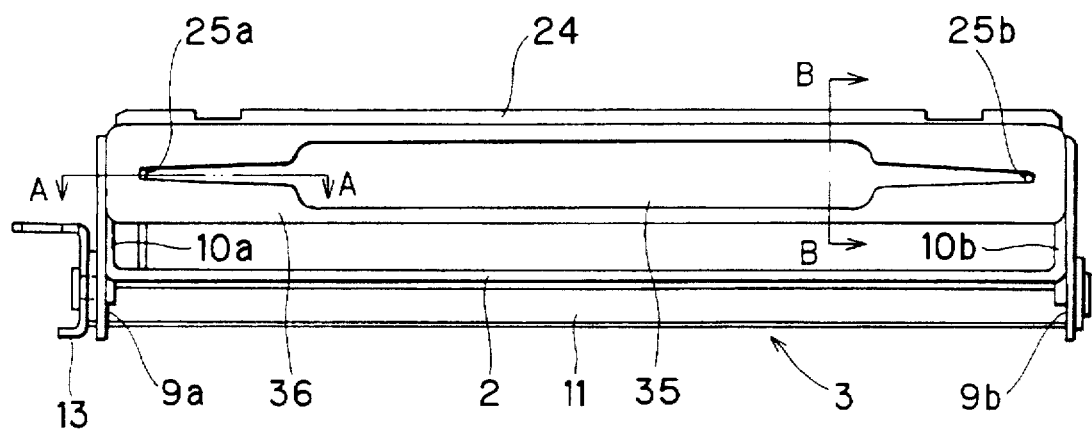
FIG. 2 is a front view showing the disc playing apparatus.
Figure 3:
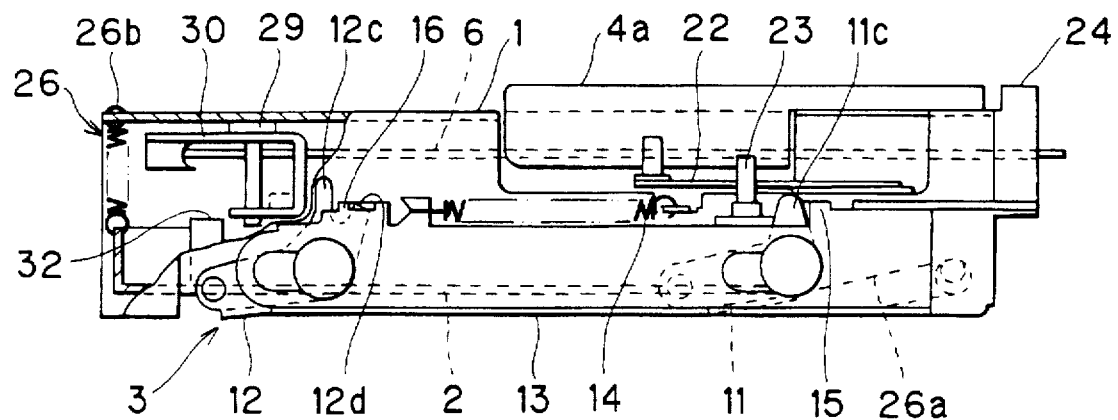
FIG. 3 is a left side view showing the disc playing apparatus.
Figure 4:
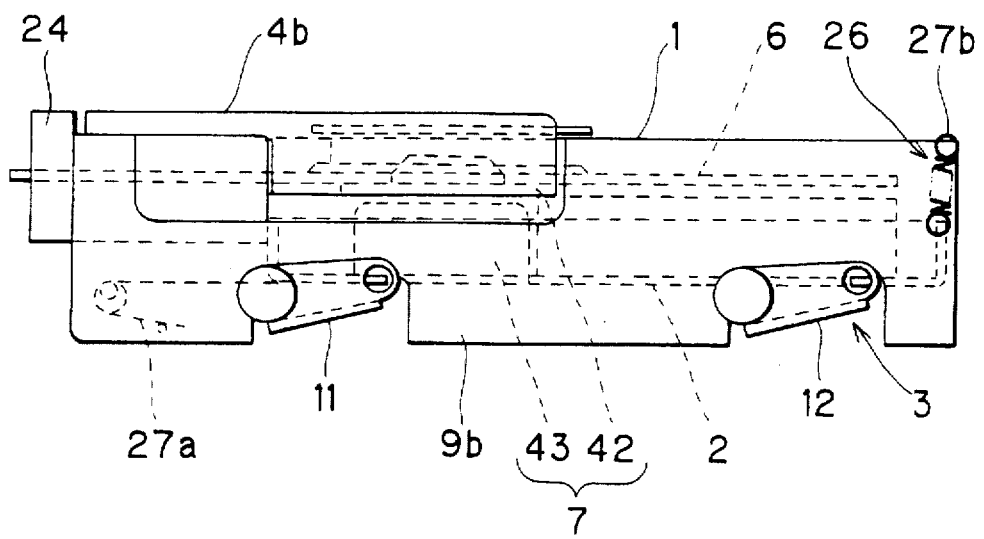
FIG. 4 is a right side view showing the disc playing apparatus.

FIG. 1 is a plan view showing the mechanical part of a disc playing apparatus, FIG. 2 is a front view showing the same, FIG. 3 is a left side view of the same, and FIG. 4 is a right side view of the same. Referring to these Figures, reference numeral 1 designates a first chassis which is held stationary in the apparatus, and reference numeral 2 designates a second chassis, which is disposed below the first chassis 1 and can be brought toward and away from the first chassis 1 by a link mechanism (coupling mechanism) 3. The first and second chassis 1 and 2 vertically face each other, and a pair of, i.e., left and right, movable guides 4a and 4b mounted on the top of the first chassis 1 such that they are pivotal about pivots 5a and 5b. The second chassis 2 carries a disc drive 7 for driving the disc 6 for rotation and a playing unit for playing data recorded on the disc 6. The two movable guides 4a and 4b have brake portions 49a and 49b of a soft material, which are to be in contact with the disc 6. The playing unit 8 can perform playing operation with the disc 6 partly exposed out of the apparatus.

The first chassis 1 has downwardly bent left and right side walls 9a and 9b, and the second chassis 2 has upwardly bent left and right side walls 10a and 10b, which are disposed on the inner side of the respective opposite side walls 9a and 9b of the first chassis 1.

Figure 5:
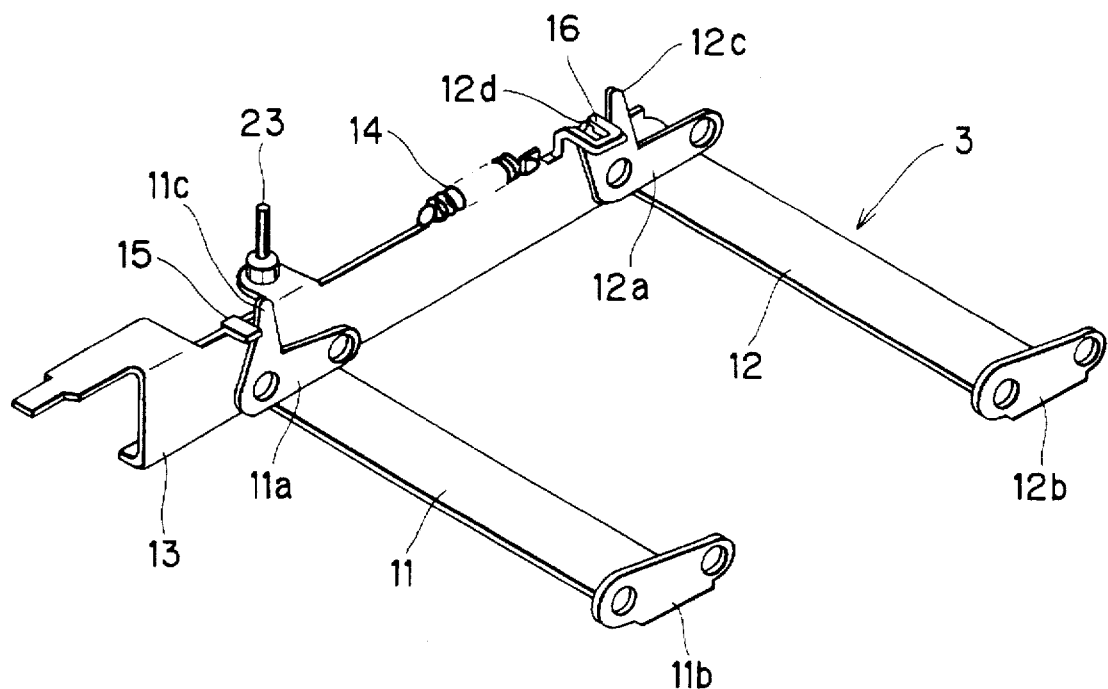
FIG. 5 is a perspective view showing the coupling mechanism.

The link mechanism 3, as shown in FIG. 5, has a pair of, i.e., front and rear, connecting plates 11 and 12 having upwardly bent opposite end link pieces 11a and 11b, and 12a and 12b, respectively. The left link pieces 11a and 12a are pivoted to left side walls 9a and 10a of the chassis 1 and 2, and the right link pieces 11b and 12b are pivoted to right side walls 9b and 10b of the chassis 1 and 2. The left link piece 11a of the front link member 11 has an upwardly extending contact portion 11c. The left link piece 12a of the rear link member 12 has, in a bifurcated fashion, an upwardly extending contact portion 12c and also upwardly extending eject lock portion (eject lock mechanism) 12d.

Figure 6:
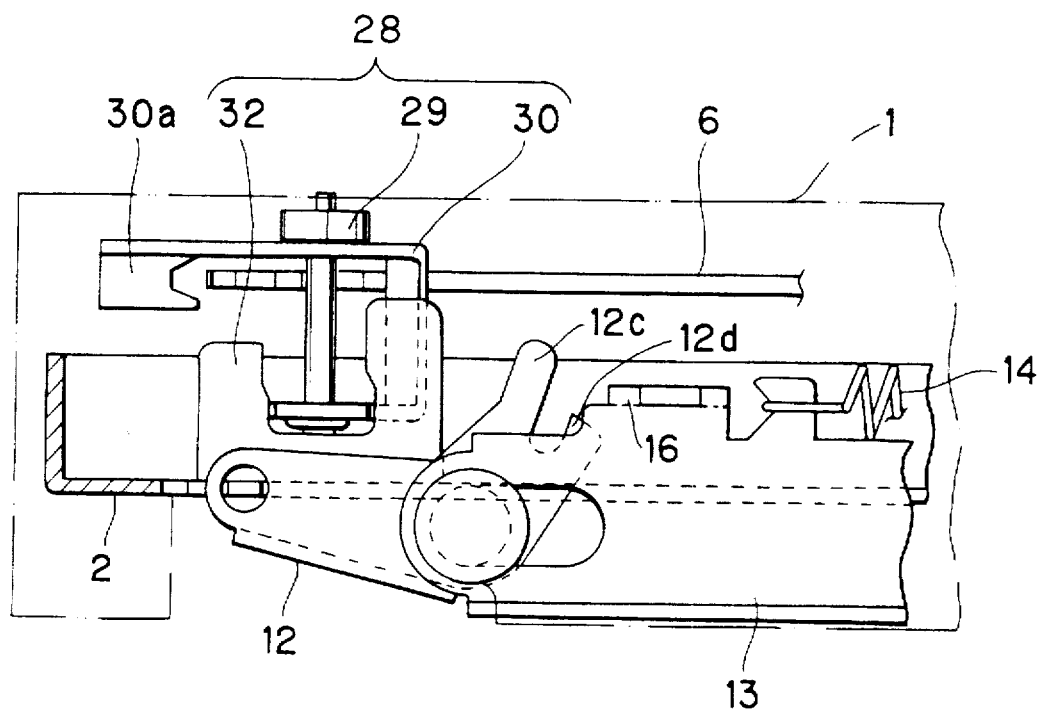
FIG. 6 is a side view showing the position relation among eject lever, lock lever and selective close/away holding mechanism.
Figure 7:
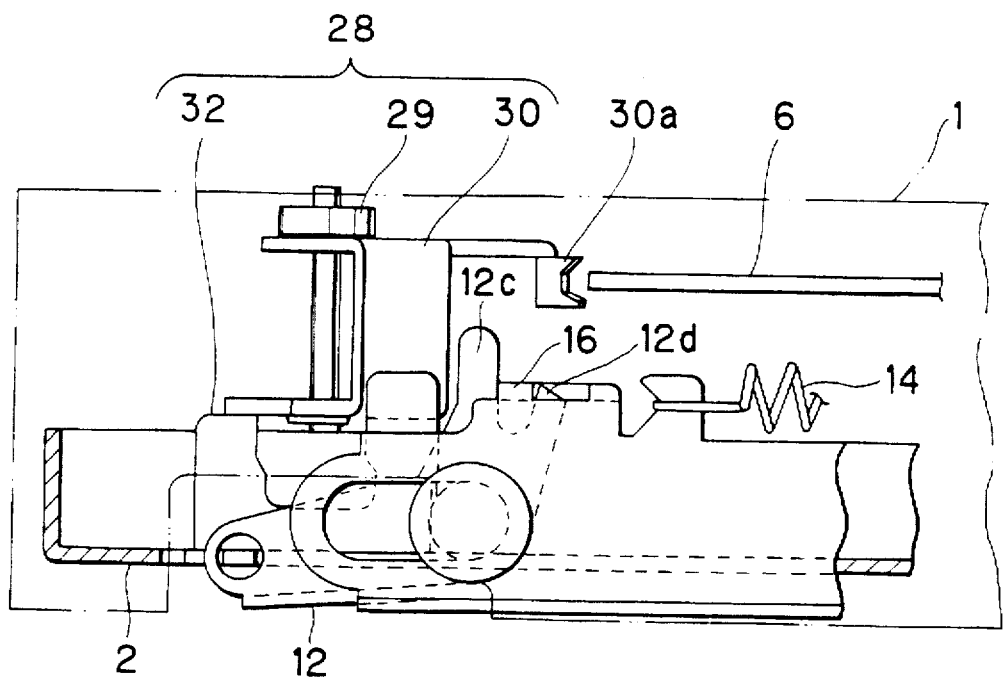
FIG. 7 is a side view showing the position relation among eject lever, lock lever and selective close/away holding mechanism.

An eject lever 13 is mounted for back-and-forth reciprocation on the outer surface of the left side wall 9a of the first chassis 1. The eject lever 13 is biased toward the front of the apparatus by a return spring 14, which is connected between the lever 13 and the first chassis 1. The eject lever 13 has two push portions 15 and 16 which correspond in position to the left link pieces 11a and 12a. When the lever 13 is moved against the spring force of the return spring 14 (i.e., from the position shown in FIG. 6 to the position shown in FIG. 7), the push portions 15 and 16 push the contact portions 11c and 12c at the same time to turn the front and rear connecting plates 11 and 12 so as to move the second chassis 2 away from the first chassis 1. With the pivotal motion of the rear link member 12, the eject lock portion 12d blocks the return path of the push portion 16, as shown in FIG. 7, thus prohibiting the restoration of the eject lever 13.

Figure 8:
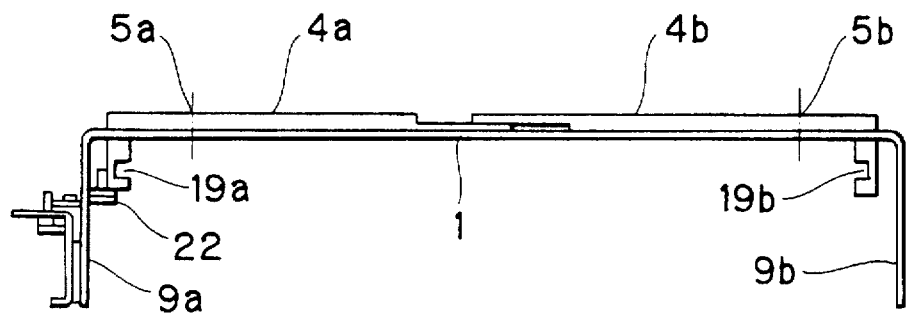
FIG. 8 is a front view showing the position relation between first chassis and movable guides.

The pair, i.e., left and right, of movable guides 4a and 4b, as shown in FIG. 1, are coupled together at one end by an engagement between an elongated groove 17 and a pin 18 and maintain their interlock relation to each other on the top of the first chassis 1. The movable guides 4a and 4b have other ends, which depend along the left and right side walls 9a and 9b of the first chassis 1 through holes formed therein. As shown in FIG. 8, the depending end portions have guide grooves 19a and 19b formed in their inner surfaces, the edge of the disc 5 being received in these guide grooves 19a and 19b.

A wire spring 20 is mounted on the top of the first chassis 1, with its left and right ends coupled to the respective left and right movable guides 4a and 4b. The wire spring 20 has a central coiled portion 20a which is coupled to a raised piece 21 of the top wall of the first chassis 1. The force of the wire spring 20 biases the left and right movable guides 4a and 4b away from each other along the left and right guide grooves 19a and 19b.

Figure 9:
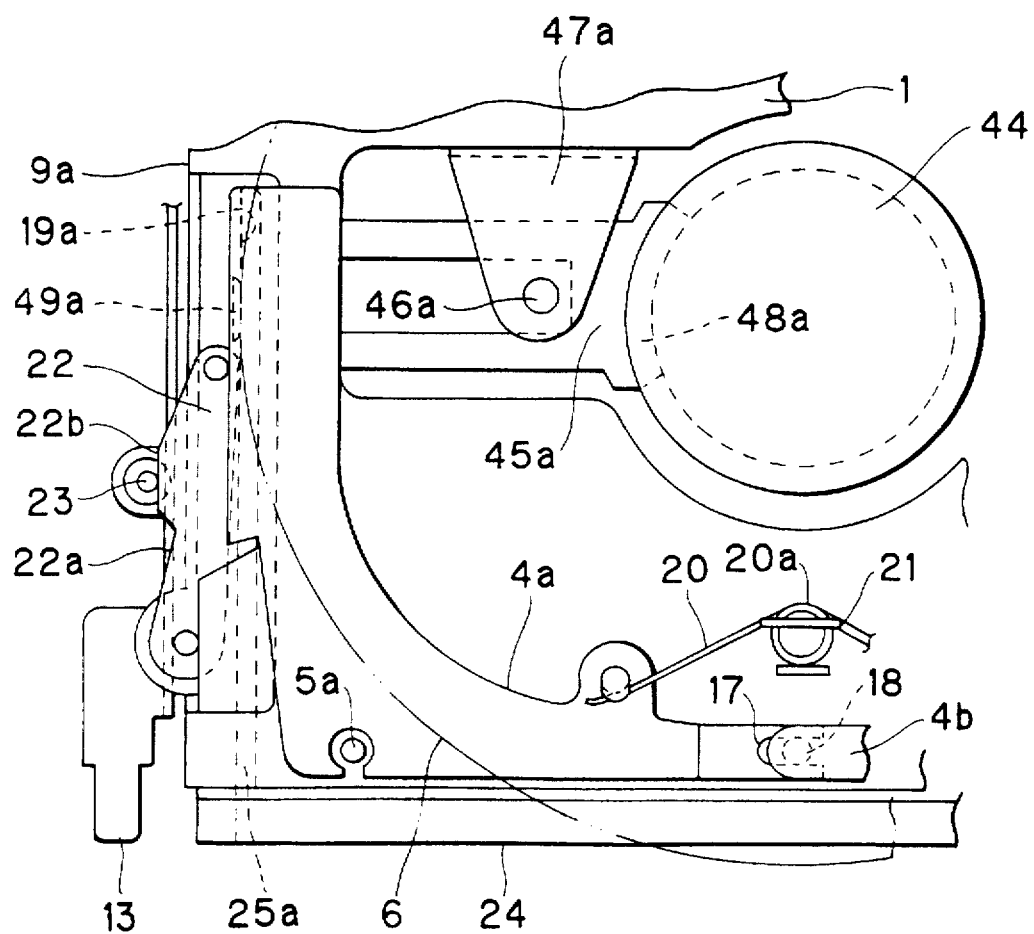
FIG. 9 is a plan view showing the position relation among movable guides, cam lever, eject lever and clamp holders.
Figure 10:
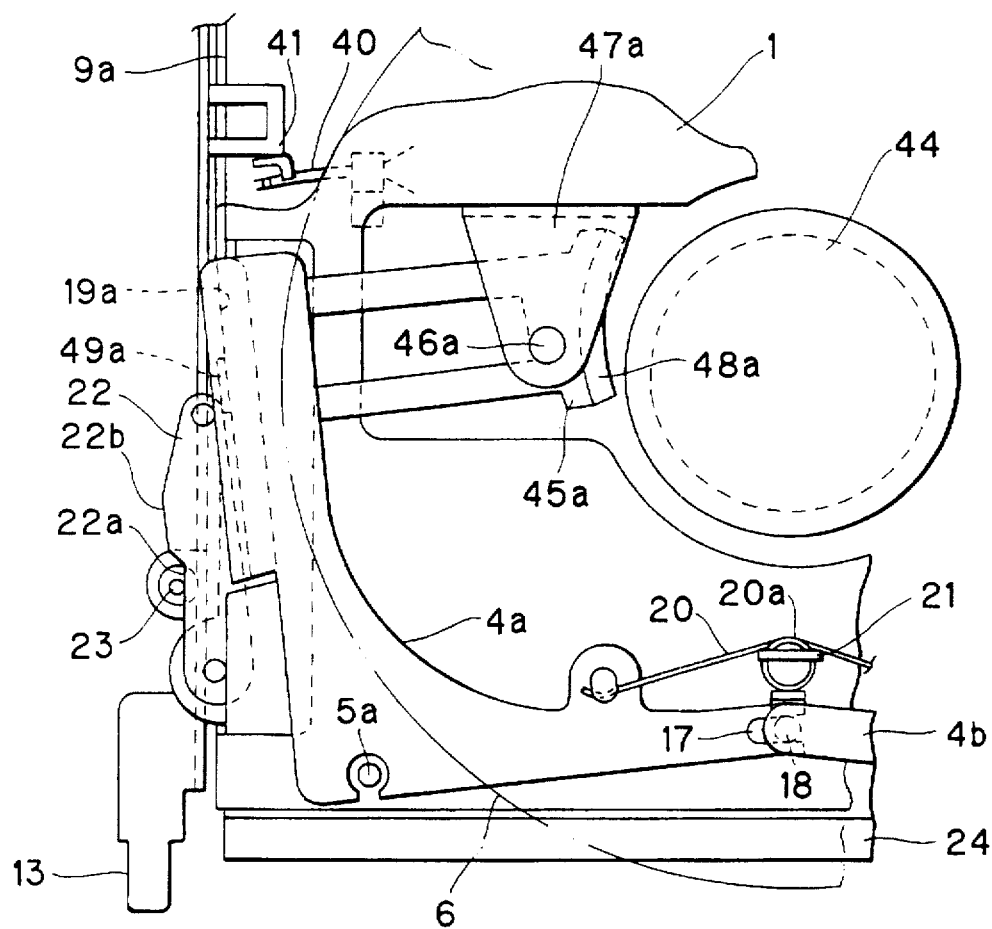
FIG. 10 is a plan view showing the position relation among movable guides, cam lever, eject lever, clamp holders and switch.

A cam lever 22 is pivoted to the first chassis 1 near the bottom thereof. As shown in FIG. 9, the cam lever 22 is located on the left side of the other end of the left movable guide 4a, and its left side surface has a low level cam surface 22a and a high level cam surface 22b, these cam surfaces 22a and 22a being continuous via an inclined surface. The eject lever 13 noted above has a cam pin 23. When the eject lever 13 is at a push position against the force of the return spring 14, the cam pin 23 is in contact with the high level cam surface 22b and has thus the cam pushed back the cam surface in the direction opposite to the direction of biasing the movable guides 4a and 4b via the cam lever 22 so as to have the movable guides 4a and 4b parallel with the guide grooves 19a and 19b thereof brought toward each other. When the eject lever 13 is restored by the return spring 14 as shown in FIG. 10, the cam pin 23 is in contact with the low level cam surface 22a of the cam lever 22 to have the left and right guide grooves 19a and 19b brought away from each other.

Figure 11:
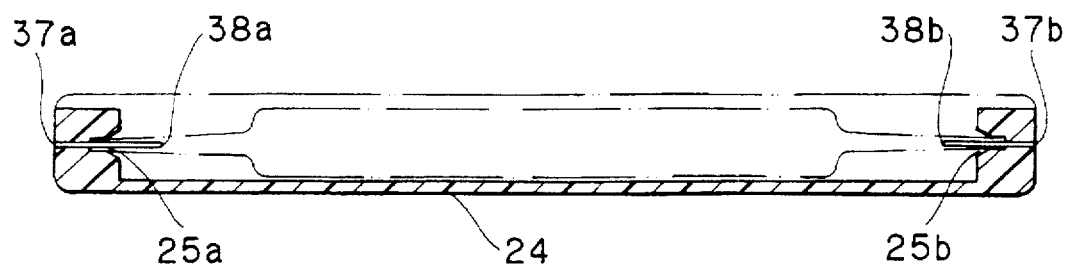
FIG. 11 is a front view showing the position relation between stationary guide and disc fly-out prevention springs.

As shown in FIG. 1, a stationary guide 24 is secured to the front of the first chassis 1 before the movable guides 4a and 4b. The stationary guide 24, as shown in FIG. 11, has a pair of, i.e., left and right, guide grooves 25a and 25b which receive the edge of the disc 6. When the guide grooves 19a and 19b of the movable guides 4a and 4b are parallel as shown in FIG. 1, the left guide grooves 19a and 25a are aligned to each other, and also the right guide grooves 19b and 25b are aligned to each other. Thus, when the disc 6 is inserted straight through the guide grooves 25a and 25b of the stationary guide 24 in this state, it is eventually led through the apparatus along the guide grooves 19a and 19b of the movable guides 4a and 4b.

The second chassis 2 is biased upward, i.e., toward the first chassis 1, by spring means 26. The spring means 26, as shown in FIGS. 3 and 4, comprises springs 26a, 26b, 27a and 27b provided on the left and right sides of the front and rear ends of the first and second chassis 1 and 2. The spring means 26 constitutes part of a selective close/away holding mechanism 28 for selectively holding the two chassis 1 and 2 close to each other, namely in the close-to-each-other state or away form each other,namely in the away-from-each-other state. The selective close/away holding mechanism 28, as shown in FIGS. 1 and 6, includes a lock lever 30 pivoted by a pivot 29 to the first chassis 1, a disc push-back spring 31 biasing the lock lever 30 in one direction, an engaging/disengaging portion 32 of the second chassis 2 on the left side thereof, and the spring means 26 noted above. The lock lever 30 has one end located substantially at the center of the apparatus in transverse direction thereof. When the disc 6 is inserted into the apparatus under the guide of the movable guides 4a and 4b, the end noted above of the lock lever 30 is pushed by the edge of the disc 6, so that the lock lever 30 is turned against the force of the disc push-back spring 31. The end noted above of the lock lever 30 has a brake portion 30a made of a soft material which is to be in contact with the disc 6. The brake portion 30a, as shown in FIGS. 6 and 7, is V-shaped in its locality facing the disc 6.

Figure 12:
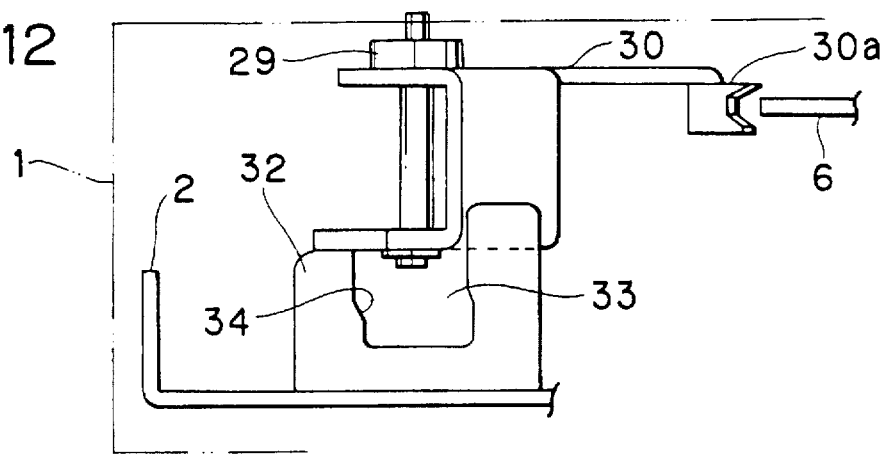
FIG. 12 is a side view showing the position relation between selective close/away holding mechanism and lock lever.
Figure 13:
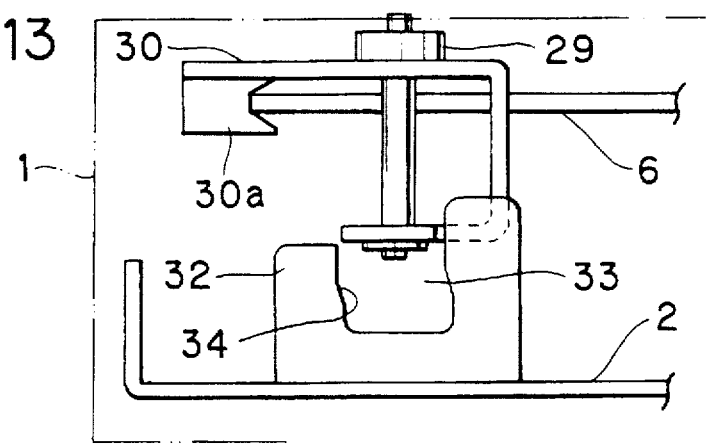
FIG. 13 is a side view showing the position/relation between selective close/away holding mechanism and lock lever.
Figure 14:
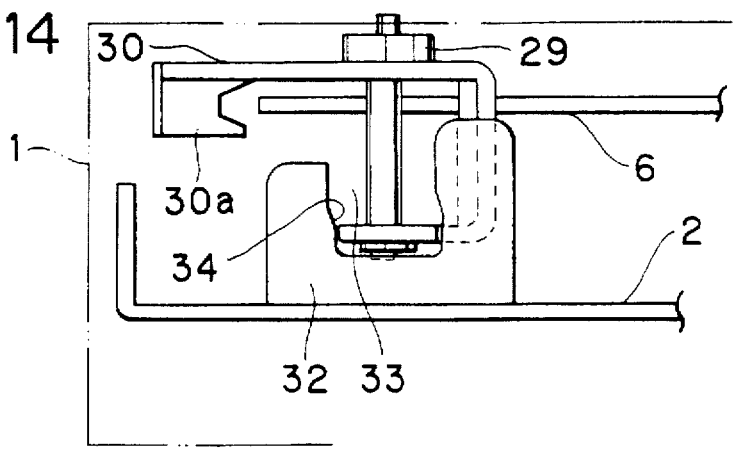
FIG. 14 is a side view showing the position relation between selective close/away holding mechanism and lock lever.

Before the disc insertion, the engaging/disengaging portion 32, as shown in FIG. 12, has its top edge in contact with the other end of the lock lever 30 to hold the two chassis 1 and 2 away from each other. When the lock lever 30 is pushed and turned by the disc 6, the other end of the lock lever 30 is separated from the top edge noted above and comes to face a recess 33, as shown in FIG. 13. In consequence, the second chassis 2 is caused to rise toward the first chassis 1. The recess 33, as shown in FIG. 14, has a vertically intermediate, inclined lever separating portion 34. Toward the end of the rising operation of the second chassis 2 (toward the first chassis 1), the other end of the lock lever 30 is guided along the lever separating portion 34 against the spring force of the disc push-back spring 31, whereby the brake portion 30a of the lock lever 30 is slightly separated from the disc 6.

The stationary guide 24, as shown in FIG. 2, has a front panel 36 having a disc insertion/take-out slot 35. The disc insertion/take-out slot 35 is communicated with the guide grooves 25a and 25b to permit the disc 6 to be inserted into and removed from the apparatus. The disc insertion/take-out slot 35 has a central increased dimension portion, the dimension of which in the thickness direction of the disc 6 is sufficiently large compared to the thickness of the disc 6. This arrangement permits prevention of the disc 6 from touching the edges of the disc insertion/take-out slot 35 irrespective of vibrations of the disc 6 in the thickness directions thereof that may be caused during data reproduction from the disc 6, which is performed in the playing unit 8 with the disc 6 partly exposed out of the apparatus. The data reproduction with the disc 6 partly exposed out of the apparatus, permits recognizing the rotation state of the disc 6 at a glance.

Figure 15:
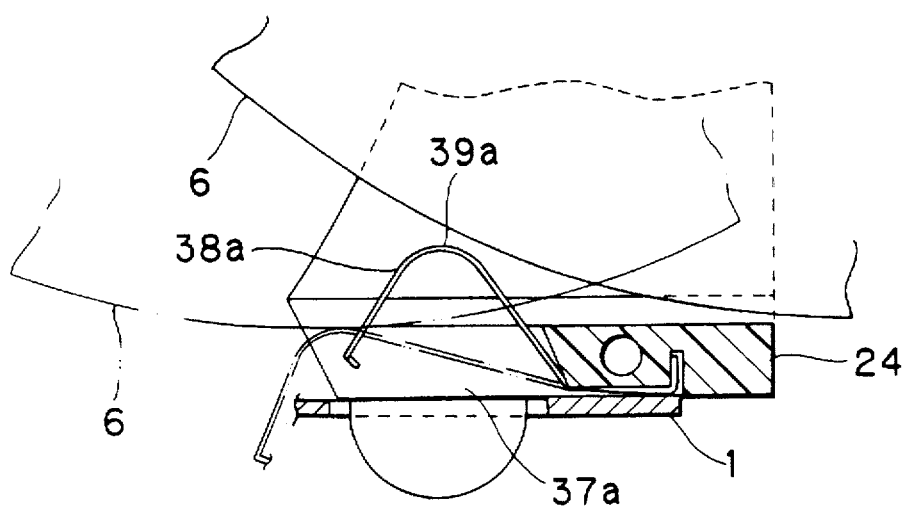
FIG. 15 is a sectional view taken along arrow line A—A in FIG. 2.
Figure 16:
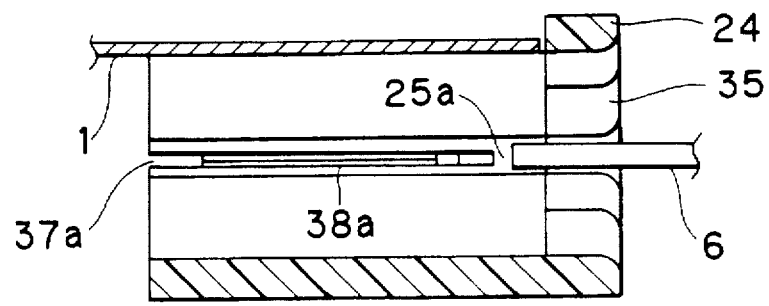
FIG. 16 is a sectional view taken along arrow line B—B in FIG. 2.

The guide grooves 25a and 25b of the stationary guide 24, as shown in FIG. 15 (which is a sectional view taken along arrow line A—A in FIG. 2) and FIG. 16 (which is a sectional view taken along arrow line B—B in FIG. 2), have part of their bottom facing the edge of the disc 6 with narrow grooves 37a and 37b (only left groove 37a being shown) having a width smaller than the thickness of the disc 6. Bent-type fly-out prevention springs 38a and 38b are accommodated in the grooves 37a and 37b such that their bent portions 39a and 39b project from the grooves 37a and 37b into the path of travel of the disc 6.

As shown in FIG. 10, a switch 40 for starting and stopping the motor 43 is assembled on the second chassis 2. The eject lever 13 noted above has a switch operating portion 41 for turning on and off the switch 40. The operation of the eject lever 13, operations of bringing the first and second chassis 1 and 2 toward and away from each other and operations of the movable guides 4a and 4b into contact with and away from the disc 6, are determined in the following timing relation.

When the eject lever 13 is pushed against the force of the return spring 14, its switch operating portion 41 is separated from the switch 40 to turn off the switch 40 so as to de-energize the motor 43. Subsequently, the cam pin 23 is moved from the low level cam surface 22a to the high level cam surface 22b (i.e., moved form the state shown in FIG. 10 to the state shown in FIG. 9), thus bringing the guide grooves 19a and 19b of the movable guides 4a and 4b into engagement with the disc 6. Subsequently, the push portions 15 and 16 push the contact portions 11c and 12c of the connecting plates 11 and 12 to bring the first and second chassis 1 and 2 away from each other,namely to the away-from-each-other state and at the same time the eject lock portion prohibits the restoration of the eject lever 13. When the disc 6 is inserted, on the other hand, the lock lever 30 is pushed and turned by the disc 6 to bring the second chassis 2 toward the first chassis 1. As a result, the connecting plates 11 and 12 are turned, causing the eject lock portion 12d to get out of the returning path of the push portion 16. The eject lever 13 is thus restored by the return spring 14. In this restoring process, the cam pin 23 is moved from the high level cam surface 22b to the low level cam surface 22a (i.e., moved from the state shown in FIG. 9 to the state shown in FIG. 10) to separate the movable guides 4a, 4b from the disc 6. Thereafter, i.e., toward the end of the operation of restoration of the eject lever 13, the switch 40 is turned by the switch operating portion 41 on to start the disc drive 7.

Figure 17:
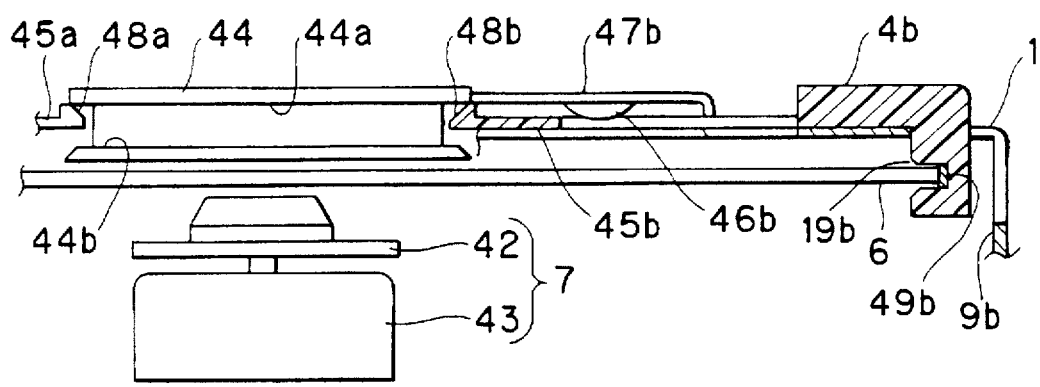
FIG. 17 is a front view, partly in section, showing the position relation among movable guides, clamp holders, clamp and turntable.
Figure 18:
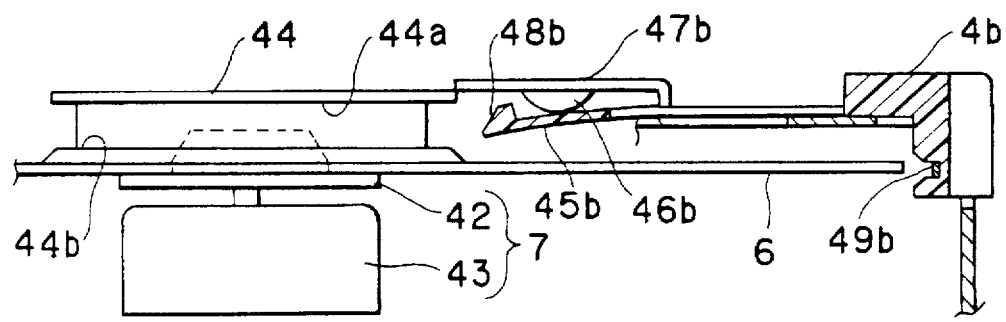
FIG. 18 is a front view, partly in section, showing the position relation among movable guides, clamp holders, clamp and turntable.

The disc drive 7, as shown in FIG. 17, has a turntable 42 to be rotated with the disc 6 supported by the turntable 42 and has a motor 43 for driving the turntable 42 for rotation. The first chassis 1 has a clamp 44 for clamping the disc 6 in cooperation with the turntable 42. The clamp 44 has upper and lower outer flange portions 44a and 44b. The pair movable guides 4a and 4b have integral clamp holders 45a and 45b made of an elastic material. These clamp holders 45a and 45b each have a central opening and a reduced thickness portion around the opening so that they can be readily elastically deformed in vertical directions. These clamp holders have muffling portions 48a and 48b provided of a soft material at their free end. The muffling portions 48a and 48b each have an inclined upper surface (FIGS. 17 to 18).

The first chassis 1 has a pair of, i.e., left and right, engaging plates 47a and 47b with the lower surface thereof having spherical engaging portions 46a and 46b. When the movable guides 4a and 4b are in contact with the edge of the disc 6, the engaging portions 46a and 46b are found in the openings of the clamp holders 45a and 45b which are held in non-contact with the engaging portions 46a and 46b, as shown in FIG. 17. When the movable guides 4a and 4b are separated from the disc 6, the clamp holders 45a and 45b are also moved away from the clamp 44, i.e., away from the central axis thereof, in the horizontal direction, and thus elastically deformed downward with their upper surface in contact with the engaging portions 46a and 46b. At this time, the muffling portions 48a and 48b are also moved in direction substantially parallel with the axis of the clamp 44, thus increasing their separation distance from the clamp holders 45a and 45b as well as the clamp 44.

When the movable guides 4a and 4b are brought toward the disc 6, the clamp holders 45a and 45b are also brought toward the clamp 44 along the horizontal direction, and are separated from the engaging portions 46a and 46b to be elastically restored upward as shown in FIG. 17. At this time, the muffling portions 48a and 48b raise the upper flange portion 44a of the clamp 44, thus greatly separating the clamp 44 from the turntable 42.

The operation of the disc playing apparatus having the above construction will now be described.

Before the disc insertion, the second chassis 2 is held away from the first chassis 1 by the selective close/away holding mechanism 28, and the eject lever 13 is held in its push position by the eject lock portion 12d. Also, the cam pin 23 of the eject lever 13 is in contact with the high level cam surface 22b of the cam lever 22, and the pair of movable guides 4a and 4b are close to each other so that their guide grooves 19a and 19b are aligned to the respective guide grooves 25a and 25b of the stationary guide 24. The clamp 44 further has its flange portion 44a supported from below by the muffling portions 48a and 48b of the clamp holders 45a and 45b.

With insertion of the disc 6 from the disc insertion/take-out slot 35 in this state, the edge of the disc 6 is received in the pair of guide grooves 25a and 25b of the stationary guide 24. As the disc 6 is further inserted, its edge gets out of the stationary guide 24 and is received in the guide grooves 19a and 19b of the movable guides 4a and 4b. Eventually, the edge of the disc 6 pushes the brake portion 30a of the lock lever 30 and turns the lock lever 30. When the disc 6 reaches a predetermined position in the apparatus, the other end of the lock lever 30 gets out of the upper edge of the engaging/disengaging portion 32 and comes to face the recess 32. The second chassis 2 thus caused by the spring means 26 to rise together with the disc drive 7 toward the first chassis 1. Toward the end of the operation in which the second chassis 2 is brought toward the first chassis 1, the lever separating portion 34 is brought into engagement with the other end of the lock lever 30 to slightly separate the brake portion 30a of the lock lever 30 from the disc 6.

As the second chassis 2 is brought toward the first chassis 1, the connecting plates 11 and 12 are turned, thus causing the eject lock portion 12d to get out of the return path of the eject lever 13, which is thus restored by the return spring 14. At this time, the cam pin 23 is moved from its position on the high level cam surface 22b to its position on the low level cam surface 22a, thus separating the pair movable guides 4a and 4b from the edge of the disc 6 and also bringing the clamp holders 45a and 45b away from the axis of the clamp 44. The clamp holders 45a and 45b are thus brought into frictional contact with the engaging portions 46a and 46b and elastically deformed downward, thus bringing the muffling portions 48a and 48b of the clamp holders 45a and 45b downward away from the flange portion 44a. The clamp 44 is thus brought onto the top of the disc 6 to clamp the disc in cooperation with the turntable 42.

With further progress of return movement of the eject lever 13, the switch operating portion 41 turns on the switch 40 of the motor 43, whereby the turntable 42 is caused to be rotated in unison with the disc 6 to start the playing operation in the playing unit 8.

When the eject lever 13 is pushed in this state, the switch operating portion 41 turns off the switch 40 to de-energize the motor 43. Subsequently, the cam pin 23 is brought from its position on the low level cam surface 22a to its position on the high level cam surface 22b to bring the movable guides 4a and 4b toward the disc 6. The brake portions 49a and 49b are thus brought into contact with the disc 6 to stop inertial rotation of the disc 6. At the same time, the clamp holders 45a and 45b are brought toward the clamp 44 to raise the flange portion 44a with their muffling portions 48a and 48b, thus separating the clamp 44 from the turntable 42. Further, the push portions 15 and 16 of the eject lever 13 pushes the contact portions 11c and 12c to turn the connecting plates 11 and 12 and thus bring the second chassis 2 away from the first chassis 1, while also bringing the eject lock portion 12d onto the return path of the push portion 16 to prohibit the restoration of the eject lever 13. At this time, the other end of the lock lever 30 is separated from the lever separating portion 34, whereby the disc 6 is pushed back by the brake portion 30a with the restoring force of the return spring 31. The disc 6 is pushed back until its edge is in contact with the fly-out prevention springs 38a and 38b, so that the excessive fly-out of the disc 6 can be prevented.

As described above, by the arrangement that the disc 6 is inserted entirely manually into the predetermined position, and when taking out the disc 6, is pushed back by the lock lever 30, no disc transfer mechanism is necessary. In addition, since the inserted disc 6 pushes the selective close/away holding mechanism 28 to automatically bring the second chassis 2 toward the first chassis 1 so as to set the disc 6 in the playing position, no specific disc setting mechanism is needed to set the disc 6 in the playing position. Further, no drive means is needed to drive such mechanisms. It is thus possible to simplify and reduce the size of the apparatus structure and greatly reduce the cost of manufacture.

Other merits of the invention are as follows. Since playing operation in the playing unit 8 is performed with the disc 6 partly exposed out of the apparatus, the state of rotation of the disc 6 can be recognized at a glance. Besides, further apparatus size reduction is obtainable. Moreover, since the disc insertion/take-out slot 35 has a sufficiently large dimension in the thickness direction of the disc 6, the disc 6 does not touch the edges of the slot 35 irrespective of its vibrations in its thickness directions.

When stopping the operation, right after the switch 40 of the motor 43 is turned off, the brake portions 49a and 49b of the movable guides 4a and 4b and the brake portion 30a of the lock lever 30 strike the edge of the disc 6 to stop inertial rotation of the disc 6. Thus, the stopping operation can be quickly completed.

The stationary guide 24 provided before the movable guides 4a and 4b, restricts the direction of movement of the inserted disc 6, thus facilitating the disc insertion. When taking out the disc 6, the excessive fly-out of the disc 6 can be prevented by the disc fly-out prevention springs 38a and 38b mounted in the stationary disc 24. Besides, since the grooves 37a and 37b from which the bent portions of the fly-out prevention springs 38a project are narrower than the thickness of the disc 6, the disc guide surfaces are above and below the springs so that the guide function of the stationary guide 24 is maintained.

Since the first and second chassis 1 and 2 are coupled together by the link mechanism (coupling mechanism) 3 such that they can be brought toward and away from each other while they are held substantially parallel to each other, it is possible to set a small maximum distance, by which the chassis 1 and 2 are brought away from each other, thus permitting further apparatus size reduction. Besides, since the first chassis 1 is secured in a fixed position in the apparatus while providing the second chassis 2 for vertical movement, the disc 6 can be inserted entirely by parallel insertion and thus comfortably.

Since the movable guides 4a and 4b and lock lever 30 have the brake portions 49a, 49b and 30a of a soft material, the disc 6 can be braked right after de-energization of the motor 43, and thus can be quickly stopped.

As the eject lever 13 is held in the push position by the eject lock portion 12d and is released from the push position when the second chassis 2 comes near the first chassis 1, it is possible to provide satisfactory timing relationship between the movement of the eject lever and the rising and lowering of the second chassis 2.

Since the eject lock portion 12d is constituted by part of the link mechanism (coupling mechanism), the apparatus structure can be further simplified.

Since the eject lever 13 is adapted to control the on-off operation of the switch 40, rising and lowering operation of the second chassis 2 and operation of causing the lock lever 30 and movable guides 4a and 4b to be brought into contact and separated from the disc 6, it is possible to provide setting of the timings of the series of these operations.

With the provision of the selecting close/away holding mechanism 28 with the lever separating portion 34, which can slightly separate the lock lever 30 from the disc 6 toward the end of the operation of bringing the first and second chassis 1 and 2 toward each other, the lock lever 30 can be automatically separated from the edge of the disc 6 in an interlocked relation to the operation of bringing the chassis 1 and 2 toward each other.

Since the movable guides 4a and 4b have the integral clamp holders 45a and 45b, which can raise the clamp 44 when the movable guides 4a and 4b are separated from the disc 6, it is possible to provide satisfactory setting of the timings of the engagement and disengagement of the clamp 44 and the turntable 42 and also the engagement and disengagement of the movable guides 4a and 4b and the disc 6.

Since the clamp holders 45a and 45b have the muffling portions 48a and 48b of a soft material to be in contact with the clamp 44, the clamp holders 45a and 45b can be brought into contact with the clamp 44 without noise generation despite continual inertial rotation of the clamp 44, as well as obtaining an anti-vibration effect and a braking effect with respect to the clamp 44.

In the above embodiment, the muffling portions 46a and 46b are separated from the clamp 44 by causing deformation of the clamp holders 45a and 45b, and adapted to raise the flange portion 44a of the clamp 44 when they are elastically restored.

Figure 19:
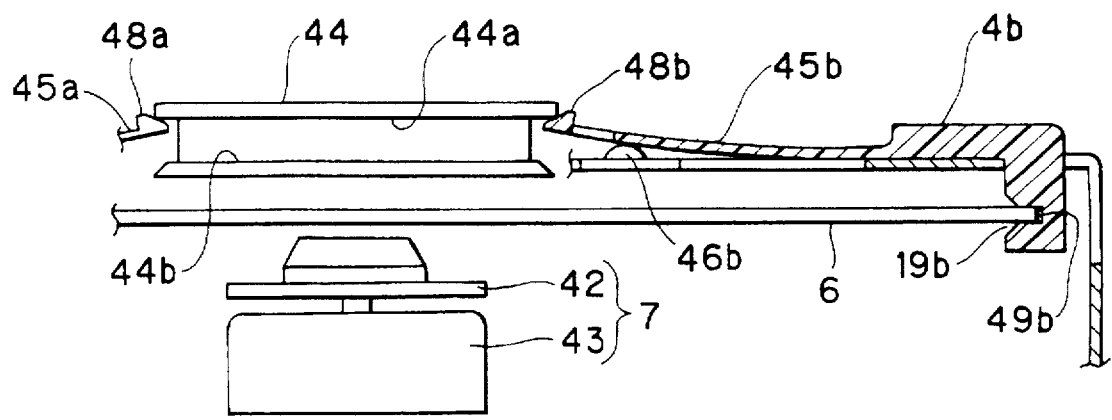
FIG. 19 is a font view, partly in section, showing the position relation among movable guides, clamp holders, clamp and turntable in an another embodiment of the invention.

Alternatively, it is possible to provide an arrangement as shown in FIG. 19, in which the muffling portions 48a and 48b are adapted to raise the flange portion 44a of the clamp 44 when the clamp holders 45a and 45b are elastically deformed by the engaging portions 46a and 46b, and separated from the clamp 44 when the clamp holders 45a and 45b are separated from the engaging portions 46a and 46b and elastically restored.

Figure 20:
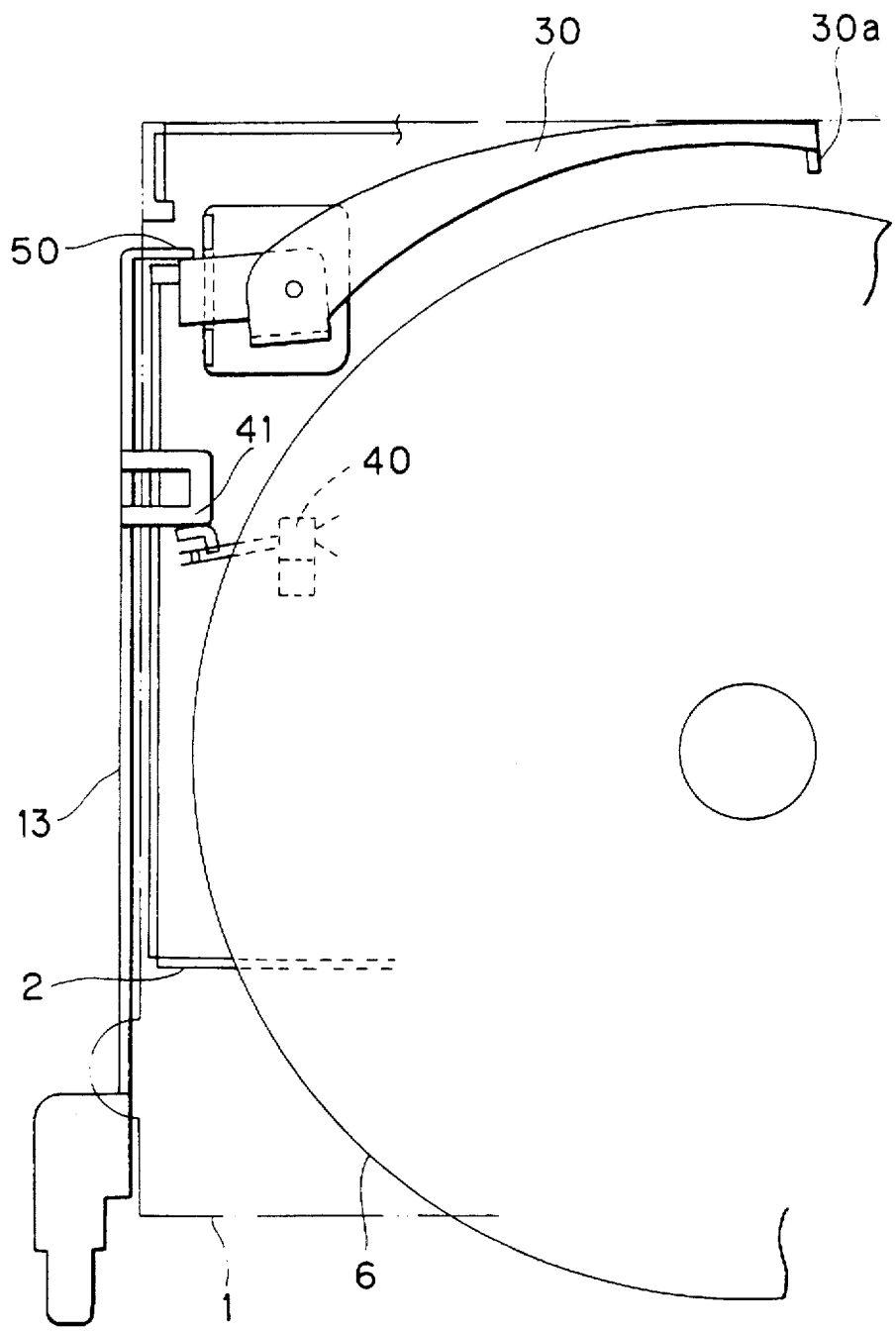
FIG. 20 is a fragmentary plan view showing the mechanical part of a disc playing apparatus of a further embodiment of the invention.

In the above embodiment, the lever separating portion 34 is formed as an inclined surface in the recess 33 in the selective close/away holding mechanism 28. Alternatively, as shown in FIG. 20, the eject lever 13 may have a bent end portion as a lever separating portion 50. In this case, when the eject lever 13 is restored by the return spring 14, in the final stage of the restoring operation, i.e., right after the switch 40 is turned off by the switch operating portion 41, the lever separating portion 50 pushes the other end of the lock lever 30, thus slightly separating the braking portions 49a and 49b of the lock lever 30 from the edge of the disc 6.

A different embodiment of the disc playing apparatus according to the invention will now be described.

Figure 21:
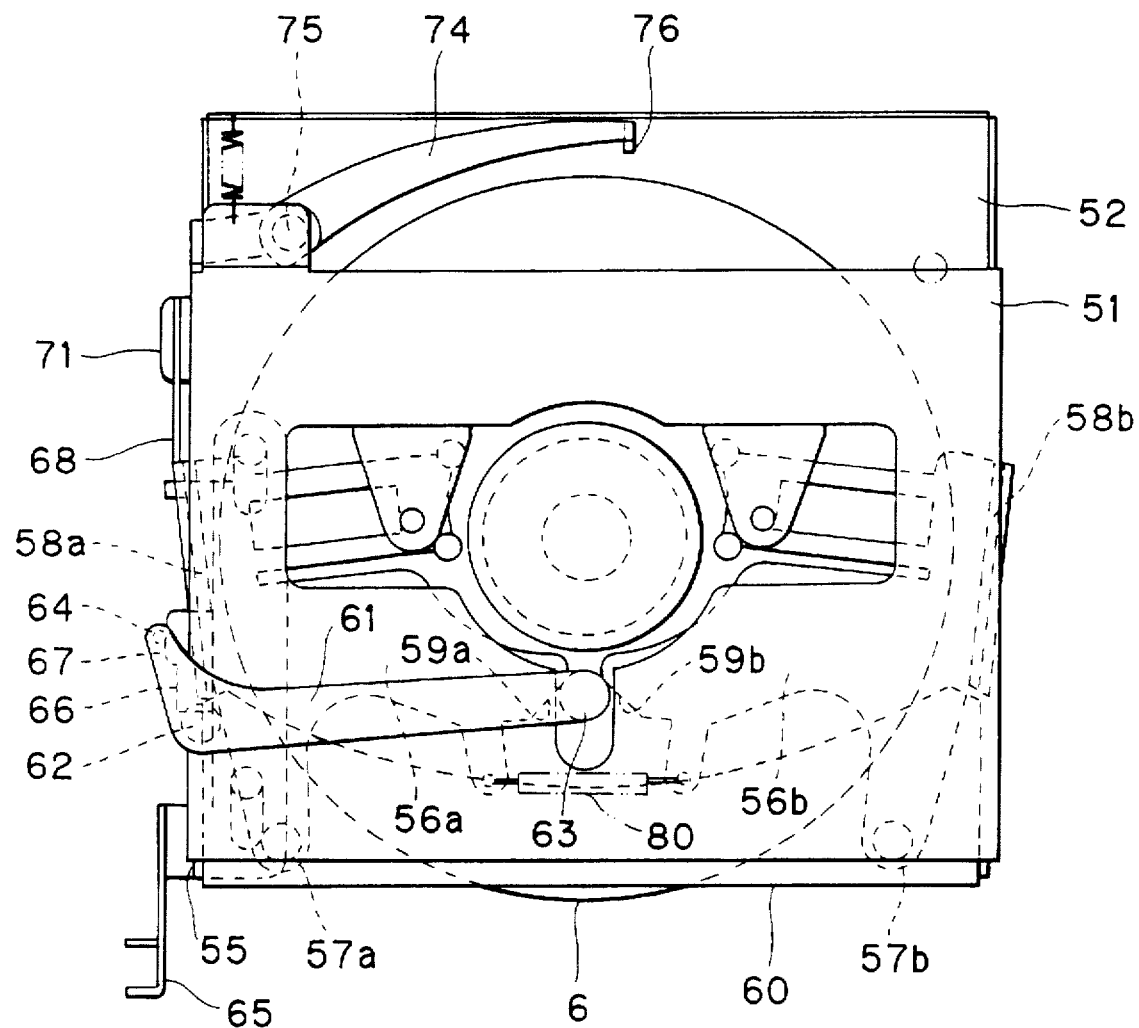
FIG. 21 is a plan view showing the mechanical part of a disc playing apparatus of a still further embodiment of the invention.
Figure 22:
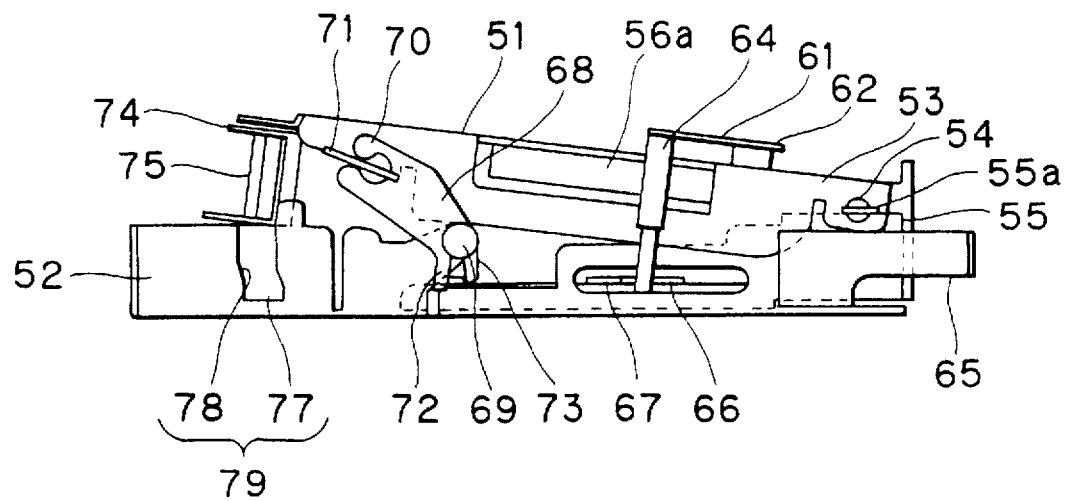
FIG. 22 is a left side view showing the embodiment shown in FIG. 21.
Figure 23:
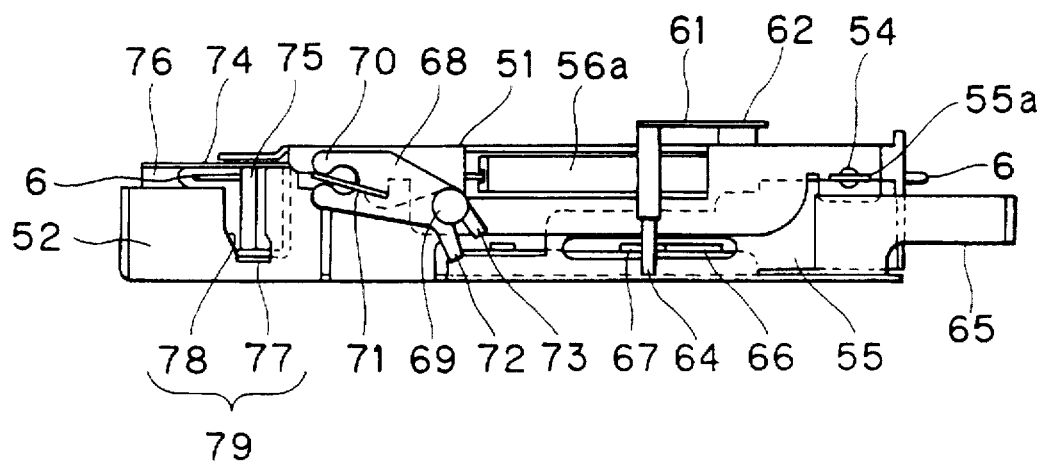
FIG. 23 is a left side view showing the embodiment shown in FIG. 21.

In this embodiment, as shown in FIG. 21, which is a plan view showing the mechanical part of disc playing apparatus and FIGS. 22 and 23, which are side views, first and second chassis 51 and 52 have their front edges pivotally coupled to each other.

As shown in FIGS. 22 and 23, the first chassis 51 has its left and right side walls (only left side wall being shown) 53 formed with round holes 54 adjacent its front edge, and the left and right side walls (only left side wall being shown) of the second chassis 52 have projections 55a which are fitted in the round holes 54, whereby the first and second chassis 51 and 52 are pivotally coupled together. The second chassis 52 is secured in position in the apparatus. It is also possible to secure the first chassis 51 in position in the apparatus.

As shown in FIG. 21, on the top of the first chassis 51, a pair of, i.e., left and right, movable guides 56a and 56b are pivotally on pivots 57a and 57b. A tension spring 80 is connected between the two movable guides 56a and 56b. The two movable guides 56a and 56b have extensions in contact with each other to hold their guide grooves 58a and 58b parallel with each other. The extensions noted above have inclined surfaces 59a and 59b. Like the previous embodiment, a stationary guide 60 is mounted on the lower surface of the first chassis 51.

On the top surface of the first chassis 1, a cam lever 61 is pivotally mounted on a pivot 62. The cam lever 61 as a first cam pin 63 provided at one end of it. When the cam lever 61 is turned in the counterclockwise direction in FIG. 21, the first cam pin 63 is led along the inclined surfaces 59a and 59b to intrude into between the two extensions to separate the guide grooves 58a and 58b from the edge of the disc 6. The cam lever 61 has a second cam pin 64 provided at the other end.

On the left side wall of the second chassis 52, an eject lever 65 is mounted so as to be moved back and forth. The lever 65 is urged by a return spring (not shown) toward the forward end of the chassis 52. In case that the first chassis 51 be fixed on the apparatus, then it is desirable that the eject lever 65 is mounted on the first chassis 51. The eject lever 65 is provided with a low level cam surface 66 and a high level cam surface 67 which are connected to each other through an inclined surface. When the eject lever 65 is located in the restored position, the low level cam surface 66 is in contact with the second cam pin 64, and when the eject lever 65 is located in the push position, the high lever cam surface 67 is in contact with the second cam pin 64. By the above arrangement, as shown in FIG. 21, when the eject lever 65 is located in the restored position, the high level cam surface 67 urges the second cam pin 64 to rock the cam lever 61 counterclockwise thereby to intrude the extended end portions of the paired movable guides 56a and 56b.

On the outer surface of the left side wall of the second chassis 2, a lift-up lever 68 is mounted such that it is pivotal about a pivot 69. One end of the lift-up lever 68 has a bifurcated clamp portion 70, which clamps a bent portion 71 formed on the outer surface of the left side wall of the first chassis 51. The other end of the lift-up lever 68 has a contact portion 72 and an eject lock portion (eject lock mechanism) 73, these portions being downwardly formed together in a bifurcated form.

Like the previous embodiment, a lock lever 74 is mounted on the first chassis 51 such that it is pivotal about a pivot 75. One end of the lock lever 74 has a brake portion 76 to be in contact with the edge of the disc 6, and the lever 74 has a downwardly bent other end portion. Like the previous embodiment, a selective close/away holding mechanism 79 is provided on the left side wall of the second chassis 52. Specifically, the left side wall of the second chassis 52 has a recess 77 open at the top. The bottom of the recess 77 constitutes a lever separating portion 78 formed by an inclined surface.

When the disc 6 is not inserted as shown in FIG. 22, the lock lever 74 has its other end in contact with the upper edge of the left side wall of the second chassis 52 to hold the first and second chassis 51 and 52 away from each other. When the disc 6 is inserted, it pushes and turns the lock lever 74, whereby the other end of the lever 74 is advanced into the recess 77 to turn the first chassis 51 downward. When the other end of the lock lever 74 reaches the lever separating portion 78, the lock lever 74 is further turned, whereby the brake portion 76 is slightly separated from the edge of the disc 6.

With the above construction, it is possible to obtain the same effects obtainable with the previous embodiment.

In the above embodiments of the present invention, the clamp holders 45a and 45b formed integrally with the movable guides 4a and 4b are arranged to raise the clamp from the turntable 42.

FIGS. 24 to 28 show an embodiment of the present invention having an arrangement different from the above embodiments.

Figure 24:
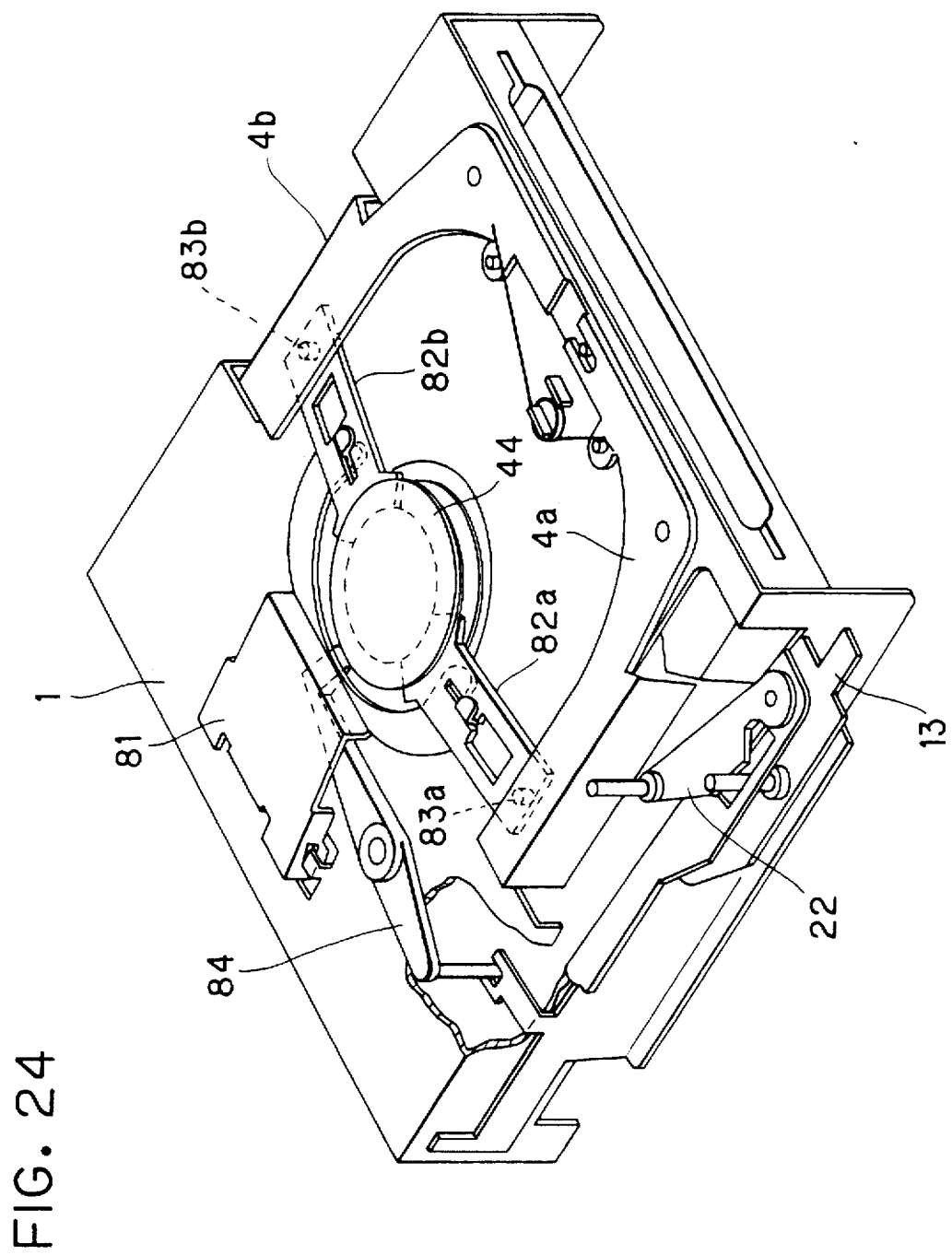
FIG. 24 is a perspective view showing a mechanical part of a disc playing apparatus of a still further embodiment of the invention.

As shown in FIG. 24, a rockable plate 81 is mounted on a first chassis 1 to be movable upward or downward. The movable plate 81 is provided with a U-shaped rocking end portion which has two distal ends with which clamp holders 82a and 82b are engaged respectively. The clamp holders 82a and 82b are connected respectively to right and left movable guides 4a and 4b through respective pivots 83a and 83b.

Further, on the upper surface of the first chassis 1 is mounted a wedge lever 84 so as to be rockable in a horizontal plane. The wedge lever 84 has one end which is positioned in the underside of the rockable plate 81 and the other end which is engaged with an eject lever 13.

Figure 25:
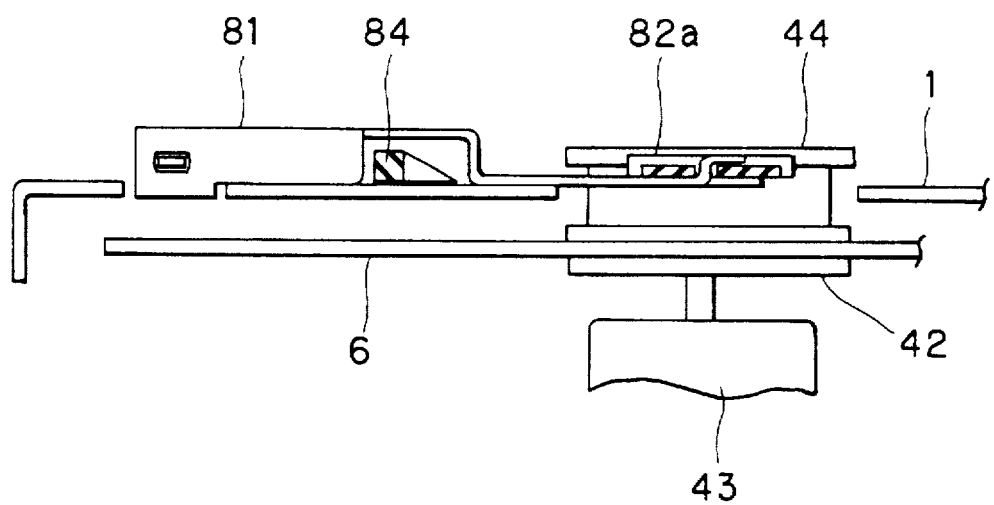
FIG. 25 is a side view, partly in section, showing a relationship between a clamp, rockable plate, clamp holder and wedge lever of the invention shown in FIG. 24.
Figure 26:
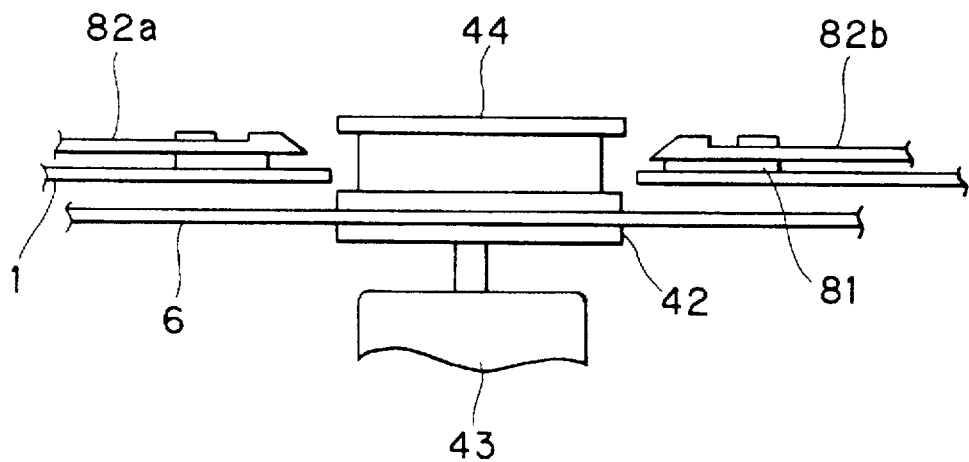
FIG. 26 is a front view, partly in section, showing a relationship between the clamp, rockable plate, clamp holder and wedge lever of the embodiment shown in FIG. 24.

Upon disc playing operation, as shown in FIGS. 25 and 26, the clamp 44 clamps the disc 6 in association with the turntable 42 so that the movable guides 4a and 4b are separated from the disc 6, and also the clamp holders 82a and 82b are separated from the clamp 44.

Figure 27:
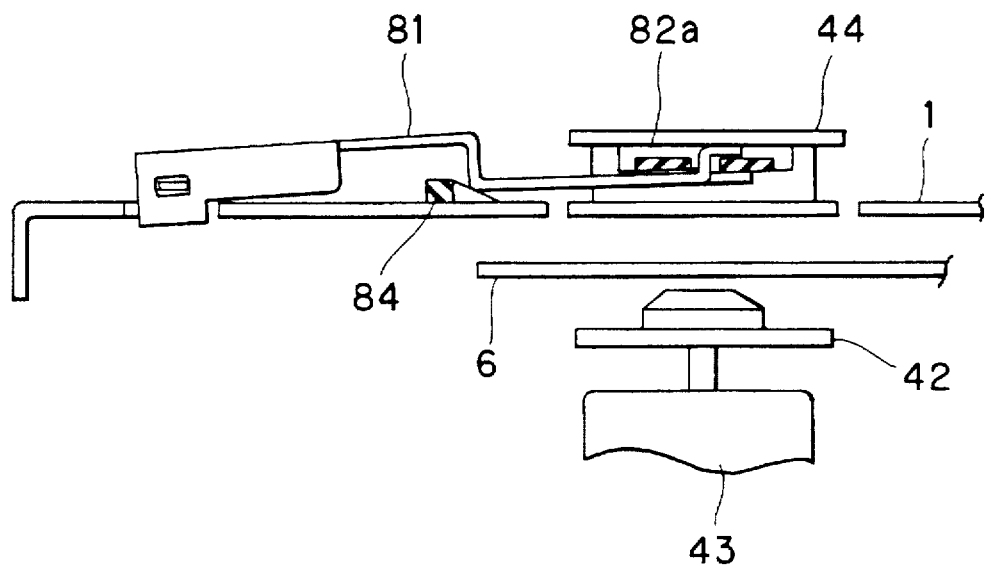
FIG. 27 is a side view, partly in section, showing a relationship between the clamp, rockable plate, clamp holder and wedge lever of the embodiment shown in FIG. 24.
Figure 28:
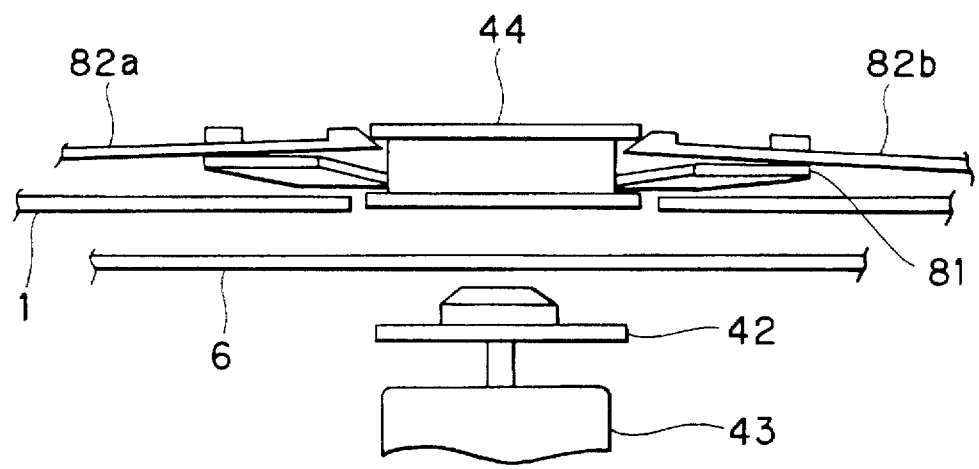
FIG. 28 is a front view, partly in section, showing a relationship between the clamp, rockable plate, clamp holder and wedge lever.

When the eject lever 13 is operatively pushed in this state, a cam lever 22 is rocked to bring the movable guides 4a and 4b toward the outer periphery of the disc 6 thereby to engage them with the outer periphery of the disc 6. When respective distal ends of the clamp holders 82a and 82b come near the clamp 44, then simultaneously the wedge lever 84 is rocked. As shown in FIG. 27, the one end of the wedge lever 84 is inserted in a wedge-shaped fashion into between the first chassis 1 and the rockable plate 81 thereby to rock the rockable plate 81 upward. Further, as shown in FIG. 28, the right and left clamp holders 82a and 82b are simultaneously rocked upward by the rocking end portion of the rockable plate 81 thereby to raise the clamp 44 so as to be greatly separated from the turntable 42.

The above arrangement of the embodiment shown in FIGS. 24 to 28 has a specific advantage in that the clamp holders 82a and 82b have high rigidity so that the disc playing apparatus of the present invention is not so much influenced by undesirable vibration from outside.

Accordingly, the clamp 44 can be securely held by the clamp holders 82a and 82b.

As has been shown in the foregoing, with the disc playing apparatus according to the invention, the disc is inserted entirely manually, and is ejected automatically as it is pushed back by the selective close/away holding mechanism in an interlocked relation to a movement of the eject lever. Thus, no disc transfer mechanism is necessary.

In addition, when the disc is inserted, the disc pushes the selective close/away holding mechanism to automatically bring the first and second chassis toward each other, whereby the disc is set in a disc playing position. Any specific disc setting mechanism for setting the disc in the disc playing position is thus unnecessary. Nor is any means for driving the mechanisms noted above necessary. It is thus possible to simplify and reduce size of the apparatus and also greatly reduce the cost of manufacture.

With the playing unit adapted to perform disc playing operation with the disc partly exposed out of the apparatus, the disc rotation state can be recognized at a glance, and also the apparatus can be further reduced in size.

With the disc insertion/take-out slot formed to have a sufficiently large dimension in the direction of the disc thickness, the disc will not touch the edges of the disc insertion/take-out slot irrespective of its vibrations in its thickness directions during rotation.

With the selective close/away holding mechanism constructed with the lock lever mounted on either one of the first and second chassis to be moved reciprocally, the return spring biasing the lock lever in one direction and the engaging/disengaging portion provided on the other one of the first and second chassis, the engaging/disengaging portion having the lever separating portion for separating the lock lever from the disc toward the end of the operation of bringing the first and second chassis toward each other, the lock lever can be automatically separated from the disc during the operation in which the two chassis are brought toward each other.

With the movable guide provided with the brake portion made of a soft material which is to be in contact with the disc, the brake portion can brake the disc right after de-energization of the motor. The operation thus can be quickly stopped.

With the stationary guide provided before the pair of movable guides such that the disc has its edge in engagement and pushed by the stationary guide as the disc is inserted, the direction of movement of the disc is restricted by the stationary guide. The disc insertion thus can be further facilitated.

With the stationary guide arranged such that the left and right inner surfaces thereof can face the disc edge are formed with grooves narrower than the disc thickness and that the disc fly-out prevention springs are disposed in these grooves such that their bent portions can project into the path of the disc, the inserted disc can reach the movable guides by pushing away these disc fly-out prevention springs with its edge. At the time of the disc ejection, the disc fly-out prevention springs prevent excessive ejection of the disc.

Besides, since disc guide surfaces are above and below the disc fly-out prevention springs, it is possible to obtain smooth insertion and take-out of the disc.

With the first and second chassis coupled together by the link mechanism such that they are brought toward and away from each other while they are held substantially parallel to each other, both the two chassis are held substantially parallel to each other, thereby to restrict the maximum dimension of both chassis separated from each other and to obtain apparatus size reduction. Further with the first chassis secured in position in the apparatus while permitting the second chassis to be moved relative to the first chassis, the disc can be inserted fully straight and comfortably.

With the different method of coupling the first and second chassis, in which the two chassis are pivotally provided for pivoting in a predetermined angle range at an end of each side to each other, the two chassis can be coupled very simply. In this case, with the first chassis secured in position in the apparatus while permitting the second chassis to be turned relative to the first chassis, the disc can be inserted fully straight and comfortably. Conversely, with the second chassis secured in position in the apparatus while permitting the first chassis to be turned relative to the second chassis, it is not needed to move the second chassis which carries the drive disc and is comparatively heavy. The chassis thus can be smoothly brought toward and away from each other.

With the provision of the movable guides with the brake portions made of a soft material to be in contact with the disc, the disc can be braked by the movable guides right after de-energization of the motor.

With the provision of the eject lock mechanism which engages with the eject lever, when the eject lever is moved against the force of the return spring to bring the first and second chassis away from each other, the eject lock mechanism acts to prohibit the restoration of the eject lever, and when both chassis come close to each other, then the eject lock mechanism acts to get out of the restoration prohibiting position. Thus, it is possible to obtain satisfactory setting of the timings of the movement of the eject lever and the relative movements of the first and second chassis.

With the eject lock mechanism constituted by part of the coupling mechanism which couples together the first and second chassis, further apparatus structure simplification can be obtained.

When the eject lever is moved against the force of the return spring, the movable guides are brought into contact with the disc after energization of the disc drive is stopped by the off-control of the switch, and then the first and second chassis are brought away from each other. Conversely, upon insertion of the disc, the eject lock mechanism releases the lock lever from its restoration prohibition in accordance with the movement of the first and second chassis from the away-from-each-other state over to the close-to-each-other state, and the movable guides are separated from the disc by the eject lever when the eject lever is returned and then the disc drive is energized by the on-control of the switch. By the above arrangement, it is possible to obtain satisfactory setting of the timing relationship between the disc drive on-off control, the operations of the first and second chassis toward and away from each other, and the operations of the movable guides.

With the provision of the selective close/away holding mechanism with the lever separating portion, which can slightly separate the lock lever from the disc toward the end of the operation of the first and second chassis toward each other, the lock lever can be automatically separated from the disc in an interlocked relation to the operation of the chassis toward each other.

Similar effects are obtainable by the provision of a lever separating portion on the eject lever such that the lever separating portion slightly separates the lock lever from the disc toward the end of the end of the restoring operation of the eject lever.

Further, according to the present invention, provided is the disc drive including the turntable rotated with the disc set thereon and the motor for driving the turntable for rotation. On the first chassis is mounted the clamp having an upper flange portion for clamping the disc in cooperation with the turntable, on the pair of movable guides is provided the integral clamp holders made of an elastic material, and on the first chassis is provided the engaging portion. In accordance with the movement of the movable guides toward and away from the disc, the clamp holder is adapted to engage with or disengage from the engaging portion and to move substantially parallel to the central axis of the clamp. In this arrangement, when the clamp holders come toward the clamp, the clamp holders greatly separate the clamp from the turntable by raising the flange portion, and conversely when the clamp holders move away from the clamp, the clamp holders are greatly separated from the flange portion. Thus, it is possible to obtain satisfactory setting of the timings of the engagement and disengagement of the turntable and the clamp and also the engagement and disengagement of the movable guides and the disc, and is also possible to ensure a sufficient distance of movement in both directions, in which the clamp holders are brought toward and away from the clamp.

With the clamp holders having muffling portions made of the soft material to be in contact with the clamp, while in continual rotation due to their inertia, can be brought into contact with the clamp without noise generation, in addition to obtaining an anti-vibration effect and a braking effect with respect to the clamp.

What is claimed is:

1. A disc playing apparatus comprising:
   a disc insertion/take-out slot into which a disc is manually inserted toward a playing position through a path of the movement of the disc in the apparatus;
   a first chassis comprising a pair of movable guides movable between a first position in which said guides are engageable with the outer edge of the disc for guiding the disc so as to be moved from said slot to said playing position and a second position in which said guides are released from the edge of the disc;
   a second chassis comprising a disc drive for driving the rotation of said disc in the playing position and a playing unit for reproducing data recorded on the disc, said playing unit being operable with the disc in the playing position;
   a coupling mechanism coupling the first and second chassis to each other such that the two chassis can be moved between a close-to-each-other state in which said pair of movable guides are located in said second position and an away-from-each-other state in which said pair of movable guides are located in said first position;
   a first spring means for urging the first and second chassis toward said close-to-each-other state;
   an eject lever biased in one direction by a second spring means and movable against the biasing force of said second spring means in another direction opposite said one direction to cause the first and second chassis to move from the close-to-each-other state to the away-from-each-other state;

a selective close/away holding mechanism for selectively holding the first and second chassis in the close-to-each-other state and away-from-each-other state, the selective close/away holding mechanism comprising:

a lock lever means biased by a third spring means to a locking position in which said first and second chassis are locked against the biasing force of said first spring means in said away-from-each-other state, and movable from said locking position by engaging with the edge of the disc when the disc is manually moved to said playing position thereby allowing said first spring means to move said first and second chassis to said close-to-each-other state; and separating means for holding said lock lever means against the biasing force of said third spring means so as to be slightly separated from the disc;

wherein said coupling mechanism comprises a prohibiting means for prohibiting the restoration of said eject lever by the biasing force of said second spring means, thereby holding the eject lever in a depressed position when the eject lever is moved in said another direction, said prohibiting means being inoperative when said lock lever means is moved from said locking position, thereby allowing the restoration of the eject lever towards said one direction;

wherein said lock lever means is allowed to move back to said locking position by the biasing force of said third spring means, wherein said first and second chassises are moved to the away-from-each-other state, thereby engaging the lock lever means with the edge of the disc so that the disc is pushed back by the biasing force of said third spring means from said playing position towards said disc insertion/take-out slot, whereby the disc is able to be taken out from the apparatus through the disc insertion/take-out slot.

2. The disc playing apparatus according to claim 1, wherein the playing unit performs data reproduction with the disc partly exposed out of the apparatus.

3. The disc playing apparatus according to claim 1, wherein said disc insertion/take-out slot has a central portion having a sufficiently large dimension in the disc thickness direction compared to the thickness of the disc.

4. The disc playing apparatus according to claim 1, wherein the lock lever means has a brake portion made of a soft material to be in contact with the disc.

5. The disc playing apparatus according to claim 1, wherein the first and second chassis are linked together by the coupling mechanism such that they can be brought toward and away from each other while they are held substantially parallel to each other.

6. The disc playing apparatus according to claim 5, wherein the first chassis is secured in position in the apparatus, and the second chassis can be brought toward and away from the first chassis.

7. The disc playing apparatus according to claim 1, wherein the first and second chassis are pivoted on one side thereof to each other for pivotal movement by a predetermined angle range by the coupling mechanism.

8. The disc playing apparatus according to claim 7, wherein the first chassis is secured in position in the apparatus, and the second chassis is pivoted with respect to the first chassis.

9. The disc playing apparatus according to claim 7, wherein the second chassis is secured in position in the apparatus, and the first chassis is pivoted with respect to the second chassis.

10. The disc playing apparatus according to claim 1, wherein the pair of movable guides have brake portions made of a soft material to be in contact with the disc.

11. The disc playing apparatus according to claim 1, wherein the eject lever, when moved in said another direction, turns off a disc drive on-off control switch, then moves the pair of movable guides toward said first position and moves the first and second chassis toward said away-from-each-other state and, when the disc is inserted, the eject lever is moved in said one direction to cause the movement of the first and second chassis from the away-from-each-other state to the close-to-each-other state, thereby moving the pair of movable guides toward said second position and then turning on the switch.

12. The disc playing apparatus according to claim 1, wherein:

said disc drive comprises a turntable to be rotated with the disc thereon and a motor for driving the turntable for rotation, the first chassis being in a substantially upper position in relation to the second chassis and comprising a clamp having an upper outer flange portion for clamping the disc in cooperation with the turntable;

the pair of movable guides having clamp holders which support said flange portion from the underside;

said clamp holders being brought away from said flange portion when the pair of movable guides are moved toward said second position, thereby allowing said clamp to cooperate with said turntable; and said clamp holders being brought toward said flange portion, when the pair of movable guides are moved toward said first position, thereby bringing the clamp away from the turntable.

13. The disc playing apparatus according to claim 12, wherein said clamp holders have muffling portions made of a soft material to be in contact with the clamp.

14. The disc playing apparatus according to claim 1, further comprising a disc fly-out prevention spring having a portion which is projected onto the path of the movement of the disc, thereby preventing excessive fly-out of the disc when the disc is pushed back by the biasing force of said third spring means.

15. The disc playing apparatus according to claim 1, wherein the disc loading and unloading operations are accomplished without the aid of a motor.

* * * * *